Jan. 13, 1959 M. J. MINNEMAN ET AL 2,869,121
SYNCHRONIZATION SYSTEM
Filed Sept. 18, 1950 2 Sheets-Sheet 1
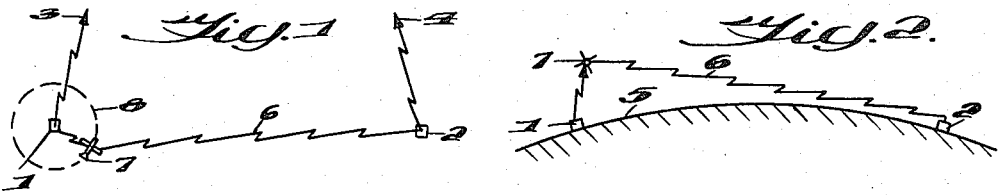
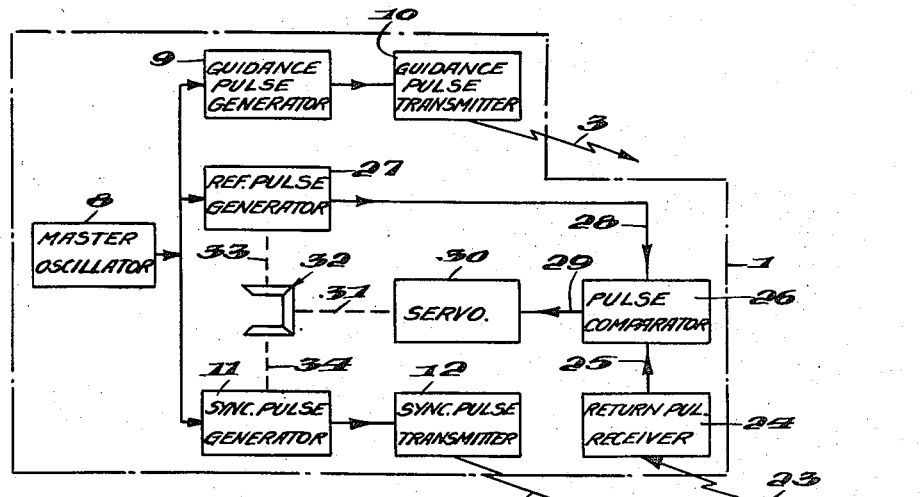
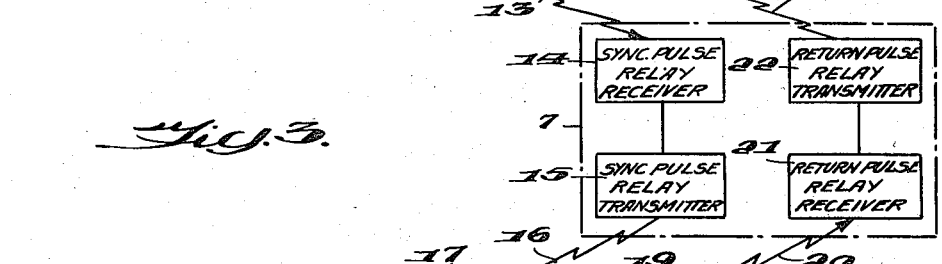
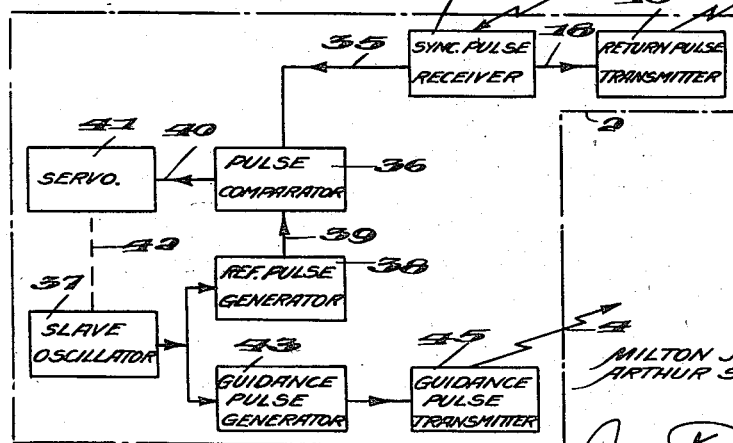
INVENTORS
MILTON J. MINNEMAN,
ARTHUR S. WESTNEAT, JR.
BY Martin E. Hogan Jr.
ATTORNEY

TIME IN M-SECS.

INVENTORS
MILTON J. MINNEMAN,
ARTHUR S. WESTNEAT, JR.

BY
ATTORNEY

United States Patent Office 2,869,121
Patented Jan. 13, 1959

2,869,121

SYNCHRONIZATION SYSTEM

Milton J. Minneman, Baltimore, Md., and Arthur S. Westneat, Jr., Franklin Township, N. J., assignors to The Martin Company, a corporation of Maryland Application September 18, 1950, Serial No. 185,448

5 Claims. (Cl. 343—103)

This invention relates to an improved synchronization system for use in conjunction with a hyperbolic guidance or navigation system.

Such hyperbolic guidance systems consist broadly of a master station at one fixed point and a slave station at another fixed point, spaced from the master station. The two stations are arranged to radiate guidance signals consisting, for example, of short periodic bursts of radio or electro-magnetic energy. The arrangement is such that each pulse sent out from the slave station is transmitted a predetermined fraction of a second later than the time of transmission of the corresponding pulse from the master station. At any point in space there will be a definite time difference between the time of reception of these two pulses. It can readily be shown that all points having the same time difference between the reception of a pair of pulses, one from each station, will be located somewhere along a hyperbolic curve having the master and slave stations as its foci. Each time difference will thus correspond to a particular hyperbolic curve passing between the stations and defining a particular line in space.

In actual practice, there are normally two slave stations associated with a master station, each of the slave stations cooperating with the master station to set up a particular family of hyperbolic curves whereby any point can be defined in terms of the particular hyperbolic curves defined by each pair and which intersect at that point.

With such a system, it is obvious that the accuracy of locating a particular point by its hyperbolic coordinants will depend directly upon the accuracy with which the time or phase spacing between the master pulse and the slave pulses is maintained at a constant value. It is therefore desirable to transmit a suitable synchronizing signal from the master station to each slave station, which synchronizing signal will be received at the slave station at a fixed time relative to the master station guidance pulse and which, in turn, can be used as a basis for the time of transmission of the slave pulse.

Were the master and slave stations permanent installations, the synchronization problem would be relatively simple but in military applications, such as for the guidance of pilotless aircraft or missiles, it is highly desirable that all equipment be highly mobile so that it can be quickly transported to, and set up, wherever the military situation at the time indicates it to be most desirable. The use of land wires for synchronization is therefore impractical with such a system. Ordinary long wavelength radio links are likewise impractical due to the relatively large size of the equipment involved, the erratic operation due to ionosphere effects, the difficulty of accurately timing the pulses, and the relative ease of detection by the enemy, with the resultant ability to take effective counter measures as by "jamming" the radio transmissions, etc. and so destroy the effectiveness of the device as a weapon.

For this reason, it is desirable to use radio waves lying in the microwave region, both for guidance pulses from the master and slave stations and also for the synchronizing signals between these stations. However, unfortunately, microwaves are limited in their use to substantially line-of-sight applications and have heretofore not been found feasible for use between the master and slave stations which are normally spaced apart much beyond the line-of-sight distance. Applicants, however, have provided an arrangement wherein the synchronizing signal from the master station is transmitted to a high flying relay airplane, flying in the general vicinity of the master station, and is relayed by such relay airplane to the slave station. It is obvious however that, since the relay airplane will be moving about, the total length of the relay path between the master and slave stations will be constantly varying. Novel means have therefore been provided for compensating for such variations in the synchronizing path so that the synchronizing pulse from the master transmitter will always be received at the slave station at a predetermined time relative to the master pulse.

It is an object of this invention to provide means for thus maintaining constant the relative time of reception of a synchronizing pulse transmitted over a synchronizing path, the time length of which is variable.

It is a further object of this invention to provide for transmitting a synchronizing signal from the master station to the slave station over a variable time length path, then to return this synchronizing signal over the same path to the master station, comparing the time length of the round trip with a standard time length, and delaying or advancing, as the case may be, the transmission of the synchronizing pulses from the master station so as to compensate for any differences between such times.

It is a further object to provide in such an arrangement, means for generating a reference pulse at the master station at a predetermined time after the master pulse corresponding to the expected round trip time length of the synchronization path, and comparing it with the return pulse sent back from the slave station, any differences in time between such pulses being detected and converted into an error signal, and then using this error signal to simultaneously vary in opposite directions the time of transmission of the master synchronizing pulse and of the reference pulse so as to bring successive pulses into coincidence.

It is a still further object of this invention to provide in such a synchronization system, a pulse comparator of extreme accuracy, which is capable of producing a useable error signal output whenever the time differences between two pulses to be compared therein exceeds a value of one or two billionths of a second.

Further and other objects and advantages will appear from a consideration of the following description and drawing.

In the drawing:

Figure 1 is a diagrammatic plan view of the guidance system.

Figure 2 is a corresponding diagrammatic elevation view thereof.

Figure 3 is a block diagram of the synchronizing system used therein.

Figure 4:
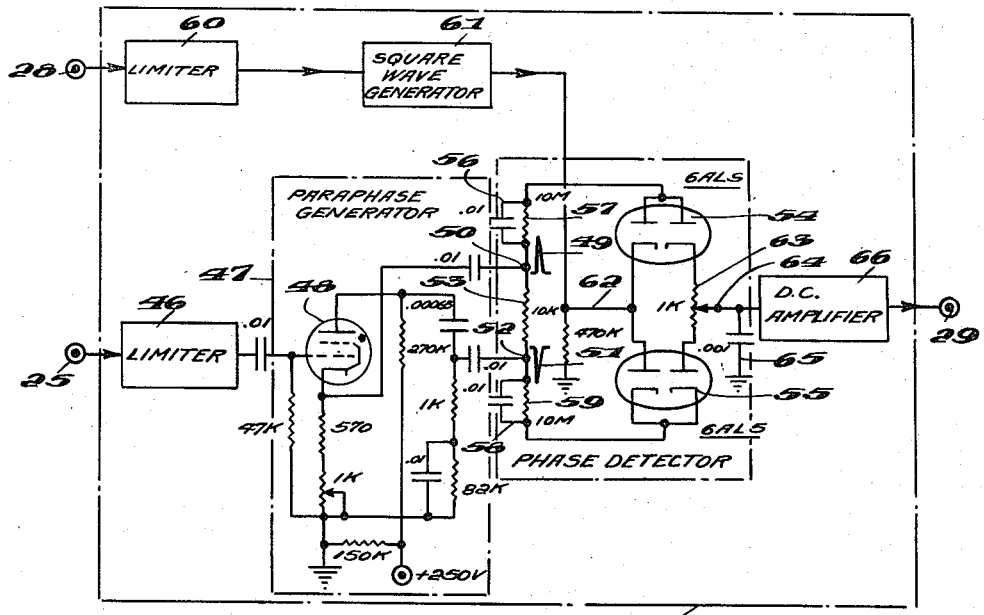
Figure 4 is a diagram of the improved pulse comparator used in the synchronizing system of Figure 3.

Figure 1 shows a master station 1 and a slave station 2, the master station being adapted to periodically transmit guidance pulses as indicated as at 3, and the slave station being adapted to transmit guidance pulses 4 having a predetermined time relationship to the pulses 3 from the master station. Since the master and slave stations would normally be spaced considerably further apart than the "line-of-sight" distance, the surface of the earth 5 would interfere with direct transmission of microwave synchronizing pulses from the master station to the slave station as clearly indicated in Figure 2. Applicants therefore provide an airplane 7, adapted to fly about an orbit 8, preferably in the vicinity of the master station, and to relay the synchronizing pulse from the master station to the slave station along a path 6. Obviously the length of path 6 will be constantly varying due to the movement of the airplane.

As indicated in Figure 3, the master station 1 includes a master oscillator 8, which serves as the primary time controlling element of the entire system. This master oscillator controls a guidance pulse generator 9 which in turn triggers a guidance pulse transmitter 10 so that the latter will transmit guidance pulses 3 at regular intervals. For ease in considering the operation of the system, the time of transmission of each pulse 3 will be called $t_0$. The pulses 3 in the instant case are repeated 400 times a second, corresponding to a time spacing between successive pulses of 2500 micro-seconds.

Also controlled by the master oscillator 8 is a variable delay synchronizing pulse generator 11 which is adapted to produce a synchronizing pulse at, for example, $t_0+500$ micro-seconds. This pulse generator is provided with an adjusting device, schematically indicated as a control shaft 34, by means of which the time relationship of the pulse generated thereby may be advanced or delayed with respect to the master pulses 3. The synchronizing pulse generator 11 triggers a microwave transmitter 12 which in turn transmits a synchronizing pulse 13 to the relay airplane 7. This pulse is detected by a receiver 14 carried on the plane and is used to trigger a relay transmitter 15 to send a pulse 16 to the slave station 2. At the slave station, the pulse 16 is detected by a receiver 17 which in turn applies a triggering pulse as at 18 to return pulse transmitter 19. The latter transmits a pulse 20 to the relay airplane which, by means of the receiver 21 and transmitter 22, relays the return pulse as at 23 to a receiver 24 which is located at the master station. The output pulse from this receiver is conducted as at 25 to one of the inputs of a pulse comparator 26.

Located in the master station and also under the control of the master oscillator is a second variable delay pulse generator 27 which is adapted to generate reference pulses at times corresponding to the expected times of arrival of the return pulses at the master station. The timing of this reference pulse generator can be adjusted by rotation of an adjusting shaft 33, the pulse timing being advanced or delayed depending on the direction and extent of rotation thereof. The reference pulses are applied as at 28 to the other input terminal of the pulse comparator 26. The pulse comparator, as will be more fully set forth herebelow, compares the arrival time of the two input pulses, detects any differences, and provides an output error signal 29 of a polarity and magnitude corresponding to the direction and extent of the time differences between the pulses. This error signal is applied to and controls the operation of a servo 30 to cause rotation of its output shaft 31 in one direction or the other depending upon the polarity of the error signal. Rotation of the shaft 31 is applied through a differential mechanism 32 to the control shafts 33 and 34 of the reference pulse generator 27 and synchronizing pulse generator 11 respectively. The arrangement is such that if the reference pulse 28 occurs prior to the return pulse 25, shaft 33 will be rotated in a direction to delay the reference pulses while shaft 34 will be rotated in the opposite direction as to advance the synchronizing pulses.

Figure 5:
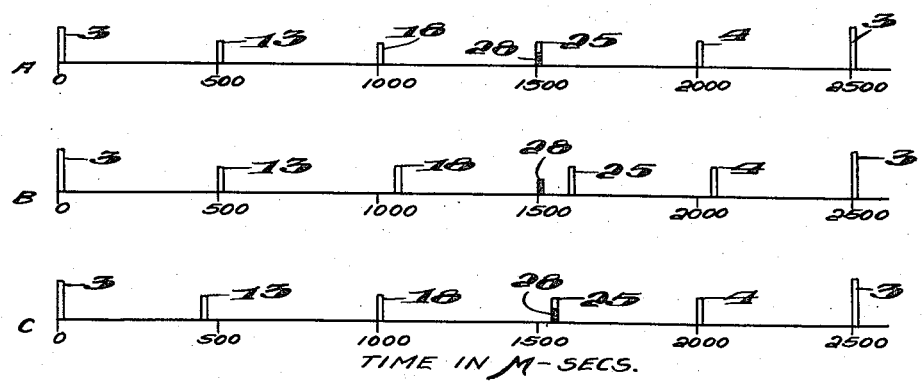
Figure 5 is a diagram illustrating the operation of the synchronized system in correcting for a change in the length of the synchronizing path.

The above action will probably be better understood from a consideration of Figure 5. Assume that the average or normal relay path 6 requires about 500 microseconds and that, as was above set forth, the pulse repetition rate of the system is 400 cycles per second. There will be a master guidance pulse at time $t_0$ and another one 2500 microseconds later, etc. As indicated at A, we will assume that the synchronizing pulse generator 11 is set to provide for a synchronizing pulse 13 to be transmitted at $t_0+500$ microseconds. This pulse will be relayed by the airplane 7 and will reach the slave station at $t_0+1000$ microseconds. The return pulse 25 will arrive at the master station and be applied to the pulse comparator 26 at $t_0+1500$ microseconds. The reference pulse generator 27 will likewise be set to provide an output pulse 28 at $t_0+1500$ microseconds. Since the pulses 25 and 28 will therefore coincide, there will be no output error signal 29.

Next, assume that due to movement of the airplane, the path of transmission 6 has been increased so that it now has a time length of say, 550 microseconds. As shown at B, the synchronizing pulse will now be received at the slave station at $t_0+1050$ microseconds and the return pulse 25 will be received at the master station at $t_0+1600$. There now appears a 100 microsecond error between the reference pulse 28 and the return pulse 25 which will cause a voltage at 29 corresponding in direction and magnitude to the time error and effective to operate the servo 30 and differential 32 to advance the timing of the synchronizing pulse generator 11 and to simultaneously delay the timing of the reference pulse generator 27. This action will continue until, as shown at C, the synchronizing pulse 13 is transmitted at $t_0+450$ under which conditions it will once again arrive at the slave station at exactly $t_0+1000$. The return pulse 25 and the reference pulse 28 will both occur at $t_0+1550$ and the system will again be properly synchronized.

While in the above example, a 50 microsecond change in the time of reception of the synchronizing pulse at the slave station was assumed, this was for purposes of illustration only, since, in actual practice a variation in the round trip path length of less than two billionths of a second (.002 microsecond) will produce a usable correction or error signal 29 which will immediately bring the system back into balance. Thus the time of reception of the synchronizing pulses will be maintained substantially constant despite changes in the path length.

While the synchronizing pulses received in the slave station could, if so desired, be used directly to trigger the guidance pulse transmitter 45, such an arrangement would result in the loss of guidance pulses from the slave station whenever there was any interruption of the synchronizing signals from the master station. To eliminate any such adverse operation, the slave station is provided with a stable slave oscillator 37, similar to the master oscillator 8 at the master station, and the synchronizing pulses are used at the slave station for comparison purposes only, to initiate correction of the frequency of the slave oscillator when it gets out of synchronism with the master oscillator. Thus synchronizing pulses from the synchronizing receiver 17 are applied as at 35 to a pulse comparator 36, where they are compared with reference pulses from a reference pulse generator 38 controlled by the slave oscillator 37, said reference pulses being applied to the other input of the pulse comparator 36 as at 39. Whenever the synchronizing pulse and the reference pulse differ, in time, there will be produced a corresponding error output signal 40 which in turn will cause operation of the servo 41 to drive the frequency adjusting shaft 42 of the oscillator 37 in such a direction as to alter slightly the frequency of the slave oscillator and consequently of the reference pulse generator 38 until the two pulses 35 and 39 are brought into coincidence. It can be readily shown that under these conditions, master oscillator 8 and slave oscillator 37 will be in exact synchronization.

Since pulse generators 38 and 43 at the slave station are controlled by the slave oscillator 37 which is maintained in exact synchronism with master oscillator 8 so long as the synchronizing system is operating, the timing of these pulse generators 38 and 43 is also effectively controlled by the master oscillator 8, which directly controls the timing of the pulse generator 9, 11 and 27 at the master station. Master oscillator 8 therefore constitutes the primary timing source for the entire guidance system.

Slave oscillator 37 is made extremely stable however, so that, even if the synchronizing signals are interrupted, it will maintain itself in substantial synchronism with the master oscillator for a considerable period of time, thus permitting the transmission of guidance signals with an acceptable degree of accuracy for as long as a half hour following loss of the synchronizing signals. Ordinarily the synchronizing signals will be restored well within this time, in which case the slave oscillator will once again be brought into exact synchronism with the master oscillator. Therefore, slave oscillator 37 can be used to directly control the guidance pulse generator 43 which in turn may be adjusted to deliver an output pulse to trigger the guidance pulse transmitter 45 at $t_0+2000$.

To provide for maximum stability of the system, it is obviously essential that the pulse comparators be capable of detecting extremely small differences in timing between the two impulses applied thereto. As was before set forth, applicants have provided such a pulse comparator, capable of detecting, and making useable for correction purposes, time differences as small as two billionths of a second. This comparator is shown in more detail in Figure 4. It consists broadly of a pair of limiters, one for each pulse, a square wave generator triggered by one of the limited pulses, a paraphase generator triggered by the other limited pulse, and a balanced phase detector responsive to relative time differences between the output of the square wave generator and that of the paraphase generator to provide an output voltage proportional to the time difference. More specifically, one of the pulses, for example, pulse 25, is applied to a limiter 46 which will provide an output pulse the magnitude and shape of which will be substantially independent of the magnitude and shape of the incoming pulse. The output pulse from the limiter 46 is applied to the control grid of a thyratron 48, included in the paraphase generator 47, causing the thyratron to "fire." As clearly indicated in the diagram, the paraphase generator is so arranged as to produce under these circumstances a very short, highly peaked, positive-going output pulse 49, derived from the cathode of the thyratron and appearing at its output terminal 50. Simultaneously there will appear, at its other output terminal 52, a similar, negative-going output pulse 51, derived from the plate circuit of the tube. Points 50 and 52 are connected together by a load resistor 53 and it is obvious therefore that the voltage represented by the pulses 49 and 51 will be impressed directly across this resistor in the form of a balanced output pulse. The peaks of these pulses will always bear a definite time relation with the leading edge of the input pulse 25.

The positive pulse 49 is applied to the plates of one of a pair of dual rectifiers 54 and 55 which are connected as a balanced phase detector. The negative pulse 51 is similarly applied to the cathodes of the rectifier 55 as clearly shown. Under these conditions, current will flow through the rectifiers in series with one another and will produce corresponding voltage drops across the resistors 57 and 59. This voltage drop will be applied across, and charge, the condensers 56 and 58. As soon as the voltage in the pulses begins to drop to a lower value, the tubes 54 and 55 will become non-conductive due to the charges stored in the condensers 56 and 58. The relative size of the condensers 56 and 58 and of the resistors 57 and 59 is such that the resistors will permit but a slight discharge of the condensers during the interval between successive input pulses. Thus during the following cycles the tubes 54 and 55 will be conductive only for a very brief instant corresponding to the rise time of the extreme peak portions of the pulses 49 and 51.

The other input pulse to the comparator is applied at 28 to its limiter 60 and the limited output therefrom is used to trigger a square wave generator 61 having a square wave output at 400 cycles, the positive and negative-going slopes of the square wave being extremely steep. These square waves are applied as at 62 between one cathode of dual rectifier 54 and the associated plate of rectifier 55. A potentiometer 63 is connected between the other cathode of tube 54 and the other anode of tube 55 and the potentiometer arm 64 is so adjusted that, when the peak of the pulses 49 and 51 occurs exactly at the same instant that the voltage from the square wave generator is passing through zero, the output voltage at 64 will be zero. If the input pulse at 25 occurs slightly later than the input pulse at 28, the peaks of the pulses 49 and 51 will also occur slightly later than the zero point of the square wave, with the result that there will be produced a voltage at the arm 64 proportional to the point on the slope of the square wave pulse at which the peak 49 occurs. Conversely, if pulse 25 leads pulse 28, the voltage at 64 will be in the opposite sense, since the peak will then appear when the voltage at the leading edge of the square wave will be on the opposite side of zero potential. Condenser 65 serves to store up and smooth out the instantaneous output voltage at 64 and then these smoothed voltages are applied to the D. C. amplifier 66, the output 29 of which is in the form of a direct current voltage having a polarity dependent upon the time relationship of the two pulses and a magnitude corresponding to the magnitude of this difference.

By providing the thyratron 48 connected as shown in Figure 4, it is possible to obtain a "push-pull" or balanced input for the balanced phase detector, the pulses of which have an extremely short rise time. It is to a large extent due to this arrangement that the extreme time-sensitivity of the comparator is obtainable. Were an attempt made to use a balanced output transformer between the pulse generator and the phase detector, it would be impossible to obtain the necessary short rise time due to the inductance present in such a transformer.

The operation of the overall system is believed to be quite obvious from the foregoing. Summed up briefly, the guidance pulse transmitter at the master station will send out its guidance pulses 3, every 2500 micro-seconds. Shortly thereafter, the synchronization pulse transmitter will be triggered to start a synchronizing pulse 13 on its journey to the slave station by way of the relay plane 7. Upon arrival at the slave station, the synchronizing pulse will be used both as a synchronizing pulse for the slave oscillator and also to trigger the return pulse 20 back to the master station by way of the relay plane. As described above, if there is any variation in the relative time of arrival of the synchronizing pulses at the slave station, it will be detected at the master station by the pulse comparator 26 which will correct the timing of the synchronizing pulse generator 11 to correct for the condition.

While in the above description, the relay plane has been shown and described as being provided with separate transmitters and receivers for the synchronizing pulses and for the return pulses, this is for purposes of illustration only, since it is obviously within the contemplation of this invention to use a single transmitter and receiver therein and to provide appropriate coding and decoding means to differentiate between these pulses. Moreover, while in the above description the time of transmission of the guidance pulse transmitter has been considered as being fixed at $t_0$, it is obvious that the timing of this transmitter may likewise be shifted by appropriate adjustment of its pulse generator 9 so as to send out the guidance pulse at some different time. By changing the timing of the guidance pulse generator 9 while leaving the other pulse generators 11, 27, 36 and 38 unchanged, it would be possible to effectively establish different hyperbolic paths for any particular time difference. Thus by appropriate control of the timing of the guidance pulse transmitter 10, a missile which has been set to fly along a particular hyperbolic time-difference path, can be shifted at will to fly some other path than that originally established.

While the system described is arranged for the transmission of discontinuous pulses both for guidance and for synchronization, it is believed obvious that continuous wave transmission could be substituted within the scope of the invention. In such a case, the phase difference between the continuous signals rather than the time differences between the individual pulses would need to be sensed by the pulse comparator. The principal of operation in each case is substantially identical however. This system also is obviously applicable where relatively long wave length transmissions are involved although, as was previously set forth, such operation would be less suitable for many purposes for the reason fully described above.

Further changes could obviously be made without departing from the spirit and scope of the invention as set forth in the appended claims.

We claim as our invention:

1. A synchronization system for use between a master station and a slave station comprising a primary timing source at said master station having a predetermined cycle time length, means controlled by said timing source for transmitting a synchronizing signal from said master station to said slave station at a predetermined time in said cycle, said signal being transmitted over a path having a variable time length, and means controlled by said synchronizing signal and said timing source for determining the actual round-trip time length of said path and responsive to an increase or decrease in said round-trip time length to cause succeeding synchronizing signals to be transmitted respectively earlier or later in said cycle by an amount equal to substantially half of said variation in time length, whereby to maintain the time of reception of said synchronizing signals at said slave station at a substantially constant point in said cycle.

2. A synchronization system for use between master and slave stations comprising a primary timing source having a predetermined cycle time length, means controlled by said timing source for transmitting a synchronizing pulse to said slave station at a predetermined time in said cycle, said synchronizing pulse being transmitted over a path having a variable time length, means controlled by said synchronizing pulse for producing at said master station a second pulse at a time in said cycle later than said synchronizing pulse by an amount equal to the actual round-trip time length of said path, means controlled by said timing source for producing a third pulse at the same master station, and means controlled by said second and third pulses for relatively oppositely varying the timing of said synchronizing pulse and said third pulse until said second and third pulses coincide in time.

3. A synchronizing system for use between master and slave stations comprising a primary timing source at said master station having a predetermined cycle time length, a first variable delay pulse generator for generating a synchronizing pulse at a predetermined time during each cycle, means for transmitting said synchronizing pulse to the slave station, means at said slave station responsive to said synchronizing pulse for transmitting a return pulse to said master station, a second variable delay pulse generator at said master station for generating a reference pulse later in said cycle than said synchronizing pulse, means at the master station responsive to said reference pulse and said return pulse for comparing the times thereof and means for equally but oppositely varying the time delays of said variable delay pulse generators until said reference and return pulses coincide.

4. A synchronizing system for use between master and slave stations comprising a primary timing source at said master station having a predetermined cycle time length, a first variable delay pulse generator for generating a synchronizing pulse at a predetermined time during each cycle, means for transmitting said synchronizing pulse to the slave station, means at said slave station responsive to said synchronizing pulse for transmitting a return pulse to said master station, a grid controlled thyratron at the master station having a cathode and anode and responsive to said return pulse to produce a balanced pair of highly peaked voltage pulses at said cathode and anode, a second variable delay pulse generator at said master station for generating a reference pulse later in said cycle than said synchronizing pulse, a square wave generator controlled by said reference pulse and adapted to produce a square voltage wave having a relatively steeply rising wave front, a phase detector responsive to said peaked voltage pulses and said square wave for producing an error signal corresponding to the instantaneous voltage of said square wave at the peak of said voltage pulse, and means controlled by said error signal for simultaneously but oppositely varying the timing of said variable delay pulse generators until said reference and return pulses coincide.

5. A high radio frequency synchronizing system for use between a master station and a slave station so located that direct radio communication therebetween at said frequency is substantially prevented, comprising an airborne relay station flying in such position as to have line-of-sight communication at all times with both of said stations, a primary timing source at said master station, means controlled by said timing source for transmitting a synchronizing pulse from said master station to said slave station by way of said relay station, means responsive to the reception of said synchronizing signal at said slave station for transmitting a return pulse from the slave station to the master station by way of said relay station, a reference pulse generator controlled by said timing source for generating a reference pulse approximately coincident with the anticipated arrival of said return pulse at said master station, comparator means at said master station for comparing the times of said return and reference pulses and arranged to produce an error signal substantially proportional to any time differences therebetween, and means responsive to said error signal for oppositely varying the timing of said synchronizing pulse and said reference pulse until said reference pulse and said return pulse coincide in time whereby to maintain the time of arrival at said slave station of succeeding synchronizing pulses substantially fixed in said cycle.

References Cited in the file of this patent

UNITED STATES PATENTS

| | | |
|---|---|---|
| 2,226,459 | Bingley | Dec. 24, 1940 |
| 2,419,525 | Alford | Apr. 29, 1947 |
| 2,429,636 | McCoy | Oct. 28, 1947 |
| 2,484,352 | Miller et al. | Oct. 11, 1949 |
| 2,514,369 | Buehler | July 11, 1950 |
| 2,530,528 | Kreer | Nov. 21, 1950 |

OTHER REFERENCES

In re Lindenblad 77 USPQ 604; 613 O. G. 1077; 1948 CD 488.